O. C. HIBARGER.
HOLDER.
APPLICATION FILED FEB. 18, 1919.

1,360,215. Patented Nov. 23, 1920.

Witnesses
W. C. Fielding

Inventor
O. C. Hibarger
By Victor J. Evans
Attorney

UNITED STATES PATENT OFFICE.

OSCAR CLARENCE HIBARGER, OF WICHITA, KANSAS.

HOLDER.

1,360,215.

Specification of Letters Patent.   Patented Nov. 23, 1920.

Application filed February 18, 1919. Serial No. 277,706.

*To all whom it may concern:*

Be it known that I, OSCAR C. HIBARGER, a citizen of the United States, residing at Wichita, in the county of Sedgwick and State of Kansas, have invented new and useful Improvements in Holders, of which the following is a specification.

This invention relates to holders or supports especially designed for cooking utensils and aims to provide a holder which may be removably secured to a vessel or utensil so as to be carried thereby.

Another object is the provision of a holder of this character which will adjust itself to vessels of various sizes and which may be easily and quickly applied to or removed from the vessel.

A further object is the provision of a holder which will support the vessel in raised position and which is constructed of hollow material so as to act as a heat insulator, so as to prevent heat from the vessel traveling to the table or support upon which the holder may rest.

A still further object is the provision of a holder or support formed of resilient material and having its ends overlapping and provided with handles, whereby the handles may be moved toward one another for the purpose of expanding the holder to permit of its application to and removal from a vessel or utensil.

Other objects and advantages of the invention will appear as the following description is read in connection with the accompanying drawings.

In the drawings.

Referring to the drawings in detail, like characters of reference denote corresponding parts throughout the several views.

Figure 1:
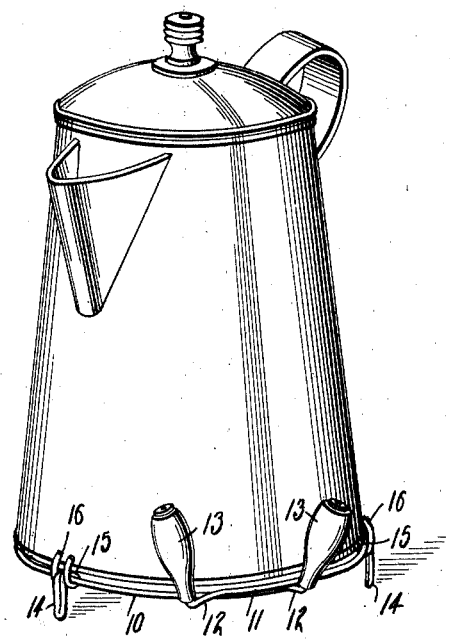
Figure 1 is a perspective view of a holder embodying the present invention and shown in position upon a coffee pot.
Figure 2:
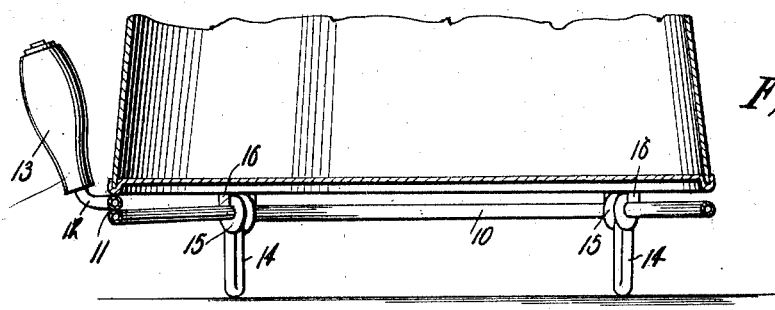
Fig. 2 is a transverse sectional view through the lower portion of the pot with the holder attached.
Figure 3:
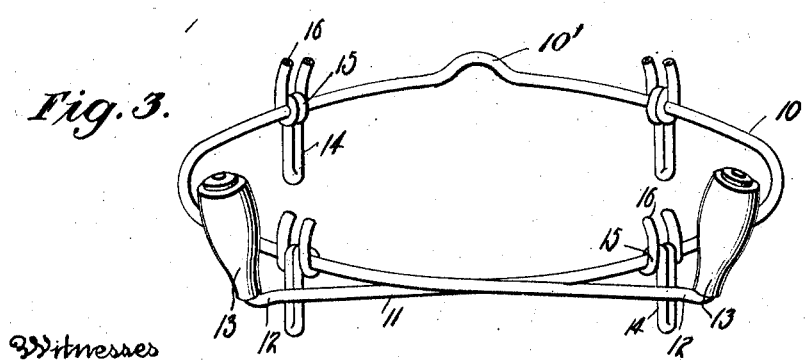
Fig. 3 is a hollow perspective view of the holder.

In the drawings the holder is shown as applied to a coffee pot, but it is obvious that it is equally well adapted to various other uses. This holder is formed of a strip of hollow resilient wire bent into substantially circular form and indicated at 10. The ends of the wire overlap and are extended as shown at 11, their extremities being bent slightly outward as indicated at 12 and then upward at an acute angle and provided with handles 13. By forming the extremities of the extension 11 in the manner shown, the handles 13 are slightly spaced from the sides of the vessel, so that danger of the burning of the fingers of the user in the manipulation of the holder is eliminated. To provide the proper gripping effect, the wire 10 from which the holder is formed, is kinked as at 10'. This insures the proper tension or grip when the holder is placed upon a cooking utensil.

The holder is supported upon legs 14, formed of hollow wire, the wire being bent upon itself as shown and twisted about the ring as indicated at 15 and welded in position. The extremities of the wire of which the legs are formed, are then bent upwardly and preferably slightly inclined inwardly to provide gripping or retaining arms 16, which are adapted to engage the sides of the pot, so as to securely retain the holder in position thereon.

In the use of the device, the ring is expanded by bringing the handles 13 inwardly toward one another when the holder is placed upon a coffee pot some distance above the bottom, the resilient end of the ring retaining it in this position. The pot may be then placed over the fire in the usual manner. When ready to serve, the pot is removed from the fire and the ring again expanded and placed at the bottom of the pot, with the arms 16 engaging the sides of the pot and the rings beneath the same, forming a support. The resilient end of the ring will retain the holder in this position and the pot may be lifted from place to place without danger of disengaging the ring. Owing to the hollow formation of the material of which the holder is formed, heat from the pot or its contents will not be imparted thereto.

This invention is susceptible of various changes in its form, proportions and minor details of construction, and the right is reserved to make such changes as will properly fall within the scope of the appended claim.

Having described the invention, what is claimed is:

A support comprising a strip of resilient material bent into substantially circular form to provide a ring and having free overlapping ends extended and crossed, spaced handles carried by the extremities of the overlapping ends, whereby, when the handles are moved toward one another the ring will be expanded and means carried by the support for engagement with a vessel.

In testimony whereof I affix my signature.

OSCAR CLARENCE HIBARGER.